US009055048B2

(12) United States Patent
Shepherd et al.

(10) Patent No.: US 9,055,048 B2
(45) Date of Patent: Jun. 9, 2015

(54) SECURE BROWSER

(75) Inventors: Eric Robert Shepherd, Miami Beach, FL (US); Paul Roberts, Carmarthen (GB); John Kleeman, London (GB)

(73) Assignee: Questionmark Computing Limited, London (GB)

( * ) Notice: Subject to any disclaimer, the term of this patent is extended or adjusted under 35 U.S.C. 154(b) by 1380 days.

(21) Appl. No.: 12/365,665

(22) Filed: Feb. 4, 2009

(65) Prior Publication Data

US 2009/0138804 A1 May 28, 2009

Related U.S. Application Data

(63) Continuation of application No. 10/791,019, filed on Mar. 2, 2004, now abandoned.

(60) Provisional application No. 60/471,181, filed on May 16, 2003, provisional application No. 60/501,004, filed on Sep. 8, 2003.

(51) Int. Cl.
*G06F 3/00* (2006.01)
*H04L 29/06* (2006.01)
*G06F 21/62* (2013.01)

(52) U.S. Cl.
CPC ................ *H04L 63/08* (2013.01); *G06F 21/62* (2013.01); *G06F 21/6209* (2013.01); *G06F 2221/2149* (2013.01); *H04L 63/168* (2013.01)

(58) Field of Classification Search
CPC ...... G06F 21/31; G06F 21/62; G06F 21/6209
USPC ............... 713/169, 151; 434/322, 362; 726/6; 715/741, 742
See application file for complete search history.

(56) References Cited

U.S. PATENT DOCUMENTS

| | | | |
|---|---|---|---|
| 3,654,708 | A | 4/1972 | Brudner |
| 4,486,180 | A | 12/1984 | Riley |
| 4,671,772 | A | 6/1987 | Slade et al. |
| 4,764,120 | A | 8/1988 | Griffin et al. |
| 4,793,813 | A | 12/1988 | Bitzer et al. |
| 4,798,543 | A | 1/1989 | Spiece |
| 4,877,408 | A | 10/1989 | Hartsfield |
| 4,895,518 | A | 1/1990 | Arnold et al. |
| 4,978,305 | A | 12/1990 | Kraft |
| 5,002,491 | A | 3/1991 | Abrahamson et al. |
| 5,011,413 | A | 4/1991 | Ferris et al. |

(Continued)

*Primary Examiner* — Haoshian Shih
(74) *Attorney, Agent, or Firm* — Brian J. Colandreo; Michael T. Abramson; Holland & Knight LLP

(57) ABSTRACT

A method for interacting with a user, comprising communicating with at least one cooperative server through a normal browser; automatically receiving encrypted data having an associated received type code indicative of a requirement for a secure browser having restricted functionality with respect to a functionality of the normal browser; selectively and automatically invoking the secure browser for handling of the received encrypted data based on the received type code associated with the received encrypted data; receiving the encrypted data with the invoked secure browser for handling thereof, wherein the received encrypted data is not available for use by the user in the normal browser and the invoked secure browser imposes restrictions on availability outside of the secure browser of decrypted data derived from the encrypted data; and communicating an input from the user, through the secure browser, to the at least one cooperative server.

22 Claims, 2 Drawing Sheets

(56) References Cited

U.S. PATENT DOCUMENTS

| | | | | |
|---|---|---|---|---|
| 5,059,127 | A | | 10/1991 | Lewis et al. |
| 5,170,362 | A | | 12/1992 | Greenberg et al. |
| 5,176,520 | A | | 1/1993 | Hamilton |
| 5,180,309 | A | | 1/1993 | Egnor |
| 5,195,033 | A | | 3/1993 | Samph et al. |
| 5,204,813 | A | | 4/1993 | Samph et al. |
| 5,211,563 | A | | 5/1993 | Haga et al. |
| 5,211,564 | A | | 5/1993 | Martinez et al. |
| 5,259,766 | A | | 11/1993 | Sack et al. |
| 5,261,823 | A | | 11/1993 | Kurokawa |
| 5,334,326 | A | | 8/1994 | Bostick |
| 5,372,507 | A | | 12/1994 | Goleh |
| 5,433,615 | A | | 7/1995 | Clark |
| 5,437,553 | A | | 8/1995 | Collins et al. |
| 5,437,555 | A | | 8/1995 | Ziv-el |
| 5,441,415 | A | | 8/1995 | Lee et al. |
| 5,496,175 | A | | 3/1996 | Oyama et al. |
| 5,513,994 | A | | 5/1996 | Kershaw et al. |
| 5,545,044 | A | | 8/1996 | Collins et al. |
| 5,565,316 | A | | 10/1996 | Kershaw et al. |
| 5,577,919 | A | | 11/1996 | Collins et al. |
| 5,597,312 | A | | 1/1997 | Bloom et al. |
| 5,618,182 | A | | 4/1997 | Thomas |
| 5,657,256 | A | | 8/1997 | Swanson et al. |
| 5,727,950 | A | | 3/1998 | Cook et al. |
| 5,743,743 | A | | 4/1998 | Ho et al. |
| 5,813,863 | A | | 9/1998 | Sloane et al. |
| 5,879,165 | A | | 3/1999 | Brunkow et al. |
| 5,947,747 | A | | 9/1999 | Walker et al. |
| 6,006,332 | A | * | 12/1999 | Rabne et al. .................. 726/6 |
| 6,112,049 | A | | 8/2000 | Sonnenfeld |
| 6,162,060 | A | | 12/2000 | Richard et al. |
| 6,259,890 | B1 | | 7/2001 | Driscoll et al. |
| 6,261,103 | B1 | | 7/2001 | Stephens et al. |
| 6,282,404 | B1 | | 8/2001 | Linton |
| 6,302,698 | B1 | | 10/2001 | Ziv-El |
| 6,311,270 | B1 | * | 10/2001 | Challener et al. ............ 713/169 |
| 6,341,212 | B1 | | 1/2002 | Shende et al. |
| 6,393,107 | B1 | | 5/2002 | Ball et al. |
| 6,418,298 | B1 | | 7/2002 | Sonnenfeld |
| 6,431,875 | B1 | | 8/2002 | Elliott et al. |
| 6,449,598 | B1 | | 9/2002 | Green et al. |
| 6,468,085 | B1 | | 10/2002 | Bergan et al. |
| 6,482,011 | B1 | | 11/2002 | Lee et al. |
| 6,482,012 | B1 | | 11/2002 | Nocera et al. |
| 6,498,920 | B1 | | 12/2002 | Simon |
| 6,505,031 | B1 | | 1/2003 | Slider et al. |
| 6,513,042 | B1 | | 1/2003 | Anderson et al. |
| 6,551,109 | B1 | | 4/2003 | Rudmik |
| 6,681,098 | B2 | | 1/2004 | Pfenninger et al. |
| 6,988,138 | B1 | * | 1/2006 | Alcorn et al. ................ 709/225 |
| 7,069,586 | B1 | | 6/2006 | Winneg et al. |
| 2001/0023482 | A1 | * | 9/2001 | Wray .......................... 713/151 |
| 2002/0097416 | A1 | | 7/2002 | Chang et al. |
| 2004/0259060 | A1 | * | 12/2004 | Kumar et al. ................ 434/118 |

* cited by examiner

SECURE BROWSER

RELATED APPLICATIONS

The present application is a continuation of pending U.S. patent application Ser. No. 10/791,019, filed Mar. 2, 2004, which claims benefit of priority from U.S. Provisional Patent Application 60/471,181 filed May 16, 2003, and U.S. Provisional Patent Application 60/501,004 filed Sep. 8, 2003, each of which is incorporated herein by reference in its entirety.

FIELD OF THE INVENTION

The present invention relates to the field of human computer interfaces for documents, preferably structured documents having information objects, in which the information objects are secure.

BACKGROUND OF THE INVENTION

Secure browsers are designed to provide a secure environment to deliver valuable content and assessments such as tests and exams. Web servers can deliver questions to any web browser, but most browsers are designed to be as open and flexible as possible. When you are delivering secure content or assessments online you need far more security than most browsers provide.

With a secure browser, a content provider can specify that secure content such as a test or an exam may only be delivered in such manner as to significantly reduce the likelihood of cheating, or inappropriate disclosure of sensitive content.

Secure browsers allow a content provider to prevent users from printing questions, using the right-click on the mouse, saving the HTML, viewing the source, and accidentally exiting an assessment in a proctored environment. The look and feel of the screen displayed may otherwise correspond to that of a normal browser, except pages may not be stored (cached) in the history, and certain menu options and icons are not displayed or are made unavailable.

Web browsers are typically flexible and open programs which aid the user in navigating the Internet, running programs or applets, and giving the user full control over what he/she is doing. But when browsers are used to take assessments, it's desirable that the user should not have full control and open access. Since the assessment is designed to measure knowledge or a skill, and sometimes has consequences for passing or failing, it's desirable that what the user can do is restricted; essentially the user should only take the assessment and not be able to perform other tasks. For example, it can be desirable that users should not be able to navigate the Internet (where they might find right answers), communicate with others, run other programs, print the screen or copy the questions to other people and so on.

This need has given rise to "secure browsers" or "locked down browsers" or "kiosk software", which are versions of standard browsers which limit the functions that the user can perform. Computers which are used to deliver assessments therefore typically have secure browsers installed, and these lock down the computers to prevent unauthorized actions while taking an assessment.

These secure browsers fulfill needs in situations where users take assessments on their own. But very often assessments are mixed in with other uses of the computer. For example, a learning management system might accept a student's login and allow him or her to choose an assessment; a student might undertake some online course (where they are allowed free use of their browser) followed by an assessment (where they are not); or a corporate executive might use their corporation's intranet, and then be scheduled for a business rules or product knowledge or safety regulation exam. Therefore, other secure browser products such as the Vantage Vanguard™ 3.0 secure desktop environment, Questionmark's own, prior Perception Secure Browser product, or Software Secure's Securexam Browser lack this flexibility, making full use of the computer in both secure and insecure modes difficult. Other secure browsers need to be specifically launched to take the assessment; they cannot be launched on demand by an ordinary browser, when secure content delivery is required.

In such mixed scenarios, it would be desirable to have a browser which can become secure when an assessment (or other secure content) is started and then become open again when an assessment (or the secure content) is finished.

Essentially the problem may be stated that it is desired that secure content to be called from insecure content, with the secure content run securely. Likewise, it is desired that an open user environment be triggered into a restricted user environment, with some assurance that the restricted conditions be maintained.

The following patents, each of which is expressly incorporated herein by reference in its entirety, relate to known testing and/or assessment systems:

U.S. Pat. Nos. 3,654,708; 4,486,180; 4,671,772; 4,764,120; 4,793,813; 4,798,543; 4,877,408; 4,895,518; 4,978,305; 5,002,491; 5,011,413; 5,059,127; 5,170,362; 5,176,520; 5,180,309; 5,195,033; 5,204,813; 5,211,563; 5,211,564; 5,259,766; 5,261,823; 5,334,326; 5,372,507; 5,433,615; 5,437,553; 5,437,555; 5,441,415; 5,496,175; 5,513,994; 5,545,044; 5,565,316; 5,577,919; 5,597,312; 5,618,182; 5,657,256; 5,727,950; 5,743,743; 5,813,863; 5,879,165; 5,947,747; 6,112,049; 6,162,060; 6,259,890; 6,112,049; 6,418,298; 6,551,109; 6,513,042; 6,505,031; 6,498,920; 6,482,012; 6,482,011; 6,468,085; 6,449,598; 6,431,875; 6,418,298; 6,393,107; 6,341,212; 6,302,698; 6,282,404; 6,261,103; WO 01/93161

SUMMARY OF THE INVENTION

It is possible to have a secure browser with secure and open operating modes, which checks whether the content of each page is secure or not before deciding how to display it. But this requires the secure browser to be running in advance of reaching the secure content. Also this would require every page of the secure content to be identified as secure and have security checking in it, whereas it would be more desirable only to security check on initiation. It is preferable to allow use of standard browsers for ordinary use, not special ones.

According to a preferred embodiment of the invention, web content (HTML, XHTML, XML, etc.) may be maintained as secure, in that participants can view and interact with it, including sending back responses, but participants should not be able to run other programs while viewing it, should be limited in their ability to navigate through the content in ways not permitted by the content, should not be able to see the source code of the document (e.g., HTML), and/or should not be able to copy or export it in any way. This is called "secure content". There are means of displaying secure content at present, but these need to be specifically started by the participant prior to encountering the secure content. The present invention covers methods and apparatus for allowing the display of the secure content through a secure browser which is launched automatically when such secure content is encountered. Typically the user would encounter a reference to the secure content within ordinary content, and would choose or be directed to run it. The secure content is identified, for example, by a MIME type (or other type that browsers can recognize), which causes the initiation of a new program, a secure browser, to run that MIME type. When the secure browser is installed, it is associated with the MIME type and any file extensions defined for the MIME type. It might also be possible to automatically download a secure browser, either as a separate application or applet, when the MIME type is first encountered.

It is particularly preferred that either the server test to ensure that the secure browser is installed before transmitting the secure content, or providing the secure content in encrypted form and prevent decryption except by a properly installed secure browser. If the secure browser is not installed correctly, the server host will not allow transmission and/or use of the secure content by the participant. Communication from the secure browser to the host of the secure content therefore preferably includes information to allow the host to verify that it is communicating with the secure browser. The secure browser then runs the secure content, providing limited functionality to prevent the participant from taking restricted actions, which may be defined by the secure content, and/or the server host. Once the secure content is finished, the secure browser closes itself.

A particularly preferred aspect of the invention provides that a user access of secure content invokes the secure browser, which otherwise is uninvolved in content viewing.

The Secure Browser is designed to provide a secure environment to deliver assessments such as tests and exams. Servers can deliver questions to any web browser, but most browsers are designed to be as open and flexible as possible. When assessments are delivered online far more security is required than most browsers provide. The test author can specify that a test or exam may only be delivered via a secure browser, to significantly reduce the likelihood of cheating.

The test author can configure a cooperating server to only deliver assessments to a secure browser. This feature allows restriction of users from printing questions, using the right-click on the mouse, saving the content or portions thereof (e.g., HTML source), viewing the source, and accidentally exiting an assessment in a proctored environment.

The look and feel of the screen displayed may be very similar to that of a normal browser, such as Internet Explorer, although the pages are not stored in Internet Explorer's history listing, and some navigation buttons and toolbars are usually omitted. Likewise, various components of a host browser or operating system may be employed for content presentation, rendering, and use.

The present method and system enables high stakes testing to be performed from a computer lab or training room, without any special configurations. Secure Socket Layer protocol (https:) may be used to frustrate network sniffing, and provide an authentication protocol to start delivering high-stakes tests.

The Secure Browser provides the same facilities as typical browsers, but it incorporates many additional security features. It may also be of interest for other applications where a secure browser is needed.

Ordinary browsers can be configured to provide a more secure environment in the following ways, among others:

- Using the browser in kiosk mode
- Using the administration kits made available by Microsoft and Netscape
- JavaScript programming However, none of these approaches are completely secure. Participants can always exit the browser, and can usually side-step your protection with special key presses or with the right-mouse context menu. Secure Browser has various security features that address these issues.

Security Features in Secure Browser

The Secure Browser may have the following security features:

Secure Browser versus Ordinary Browsers

| Security Issue | Ordinary Browser | Secure Browser |
|---|---|---|
| Printing and copying | Participants can print out questions, or copy them into applications to pass onto others. Even with assessments using random selection from a question bank (so that each test is different), the question bank is not of unlimited size.<br>So if many participants copy the test they have received, the full question bank will not remain secret for long. | All printing is disabled unless Secure Browser is configured to allow printing on the current page. Copying documents or screen shots to the clipboard is also disabled. |
| Screen display | Participants can change the screen size and use other software from the desktop, and use the navigation buttons and menu items. | Assessments always take up the whole Windows display. No browser menus are presented. The toolbar can be hidden or its buttons enabled or disabled. |
| Screen refresh | Participants can disrupt the testing process inadvertently. For example, it's common to present several questions in one document, but not submit the answers to the server until a "submit" screen button is pressed after they are all answered.<br>If the participant answers some questions, and then refreshes (reloads) the screen, the unsubmitted answers will be lost. | Refresh (reload) the screen is disabled unless Secure browser is configured to allow refresh on the current page. |

-continued

| Secure Browser versus Ordinary Browsers | | |
|---|---|---|
| Security Issue | Ordinary Browser | Secure Browser |
| Shortcut keys | Participants can pretend that the software failed, in order to invalidate their attempt (if they know they are doing badly). For example, they might press Ctrl+W or Alt+F4 to close the browser, or Backspace to go back in the browser and lose their current answers, and pretend it was inadvertent or was a software error. This is a concern when a participant is limited to a maximum number of attempts (for example, three in their lifetime) or must wait a fixed time before retaking an examination if they fail it. | All browser control keys and right-mouse context menus are disabled. The only way to exit Secure browser is from the toolbar if it is visible or by having a button provided by the server to exit. Unless the participant is prepared to turn off the machine, they cannot disrupt the assessment. |
| HTML source | Participants can view the source of the HTML documents. Although the system does not put any sensitive information like correct answers in the source of HTML, there is some information that could be of interest to someone trying to subvert the system, for example the URLs to graphics or multimedia objects. | HTML source documents cannot be viewed. |
| Other URLs | Participants can access other URLs while taking a test, for example websites that might contain the right answers to the questions. | The participant can't enter a URL. A start URL is defined, and the only other URLs that can be navigated to are those linked to from the assessment. |
| Other software | Participants can use other programs on their PC, for example, spreadsheet or calculator programs or email clients. | No other software is available to the participant. Task switching is disabled, and other programs cannot be run. |
| Application capture | It's possible to capture the screens presented in a variety of ways including using screen capture programs which capture the screen every few seconds or screen sharing programs which allow you to application share and copy your screen to other computers. | A secure browser can detect all other processes and applications running on the PC, and either refuse to run if certain applications are running, automatically shut down any processes or applications on a "black list" of known problem applications and/or keep a list of all the processes and applications running on the computer at the time of delivery of the secure content, and include this list with the test results, so that a future audit can check whether any unsuitable processes were running. |

The secure browser is most secure when it is run on a controlled PC, for example in an exam center or in a controlled computer lab. If you can control the PC being used for the assessment, you can make a completely secure environment to take tests in. But a secure browser can also be used when delivering tests remotely, when a participant uses their normal PC at home or in their office to take assessments. The test administrator can use a template setting that forces any assessment that uses the template only to be available if the assessment is being taken with secure browser. The assessment will not run in any other browser, even if it is being taken remotely. This won't deal with all the above concerns; for example, other URLs can still be accessed on a second computer. But it will still be very difficult to print out tests or copy them to other applications to pass on to other parties.

To improve security, the PCs used by participants should be booted up and the secure Browser should be started before they arrive. It may be possible to automate this in some way, either by putting Secure Browser in the Startup folder, or by using other tools. The system may be vulnerable if the PC can be turned off and then re-booted, since this will exit Secure browser. It is possible to supervise the PC to prevent this. Some organizations also use closed circuit TV or a video camera to record exam centers to monitor such attempts to bypass the security.

In order to frustrate attempts to capture ASCII or text data from secure content, this may be transmitted and/or rendered as a graphic content object, rather than as a text object.

The present system and method may thus be used to: Stop people from printing questions; Stop people from typing in their own URL; Always display in full screen so it's not possible to maximize or minimize; Avoid display of menu options or icons; Disable control keys; Disable right-click menu options; Prevent going backwards to a previous page;

Stop people exiting in a high stakes, proctored, environment; Prevent running other programs, like a calculator or spell-checker, if this is desired; Hide the HTML source; Prevent application capture and application sharing; and Provide an API to control certain functions of a browser from the server; command the secure browser, by a cooperative server, to display a toolbar;

The following can be enabled from the server if the assessment requires these features: Print the current page; Close browser; Back button; and Refresh the current page The present invention provides three particular aspects of interest: (a) Launch of a secure browser from a regular browser; (b) Indicate which web page to 'get'; and (c) Server authentication that the correct browser has been launched Launch of a Secure Browser from a Regular Browser Internet technologies allow a MIME type to be specified to indicate to the computer operating system which program should be used to display the content. The MIME type may be defined by the file extension or the Content-type header returned by a web server. The present invention, for example, specifies a new MIME type of "Questionmark Secure Browser" (or equivalent) which starts the secure browser to display the assessment or e-learning content that requires more security than a normal browser would provide.

A web page contains a link (triggering link) that, when accessed, passes a MIME type to indicate that a secure browser is required to display this content.

Indicating which Web Page to 'get'

While the MIME type specifies that the content must be displayed in a secure browser, it doesn't specify where the content is located. There are three general alternatives: (1) Allow the original link to specify the URL or the content so that the secure browser can call the content using a normal http GET command; (2) Allow the secure browser to have a system configuration that allows the secure browser to be triggered to call a specific URL or IP address; and (3) Allow the secure browser to have a system configuration that allows the secure browser to be trigged to call a specific URL or IP address along with a parameter that was provided as part of the trigger (combining (1) (2), above—the server URL/IP address is configured within the secure browser while the specific assessment and other details is defined in the trigger). It's also possible to have the cooperating server provide some of the details.

Server Authentication that the Correct Browser has been Launched

While the MIME type specifies that a secure browser should be used, it is possible that other applications could intervene and display the content insecurely. Current browsers can do this by indicating their name in the HTTP User-Agent header, but this can be 'spoofed' or forged quite easily. These limitations require there be a method of authentication to confirm that a secure browser is truly running within the users' environment. This can be effectively accomplished by the secure browser authenticating itself in the HTTP headers or other information it sends to the web server. Likewise, there can be an exchange of information between server and secure browser, for example similar to the Kerberos protocol or IEEE-1394 Digital Transmission Content Protection (DTCP), to authenticate the browser and/or the server to one another, as required.

Cryptographically secure authentication methods include, but are not limited to: Shared secret (a key is configured within the secure browser and at the server; the keys must match to allow authorization); Exchange of tokens based on shared secrets; Exchange of limited life tokens based on shared secrets; Exchange of public and private keys (public key encryption); and Specific values in the HTTP_USER_AGENT or other HTTP keys.

It is therefore an object of the invention to provide a secure user interface method, for interacting with a user through a browser, the browser providing a set of navigational functionality, comprising requesting a document from a cooperative server; receiving data in response to the request; automatically determining whether a secure browser is required to be employed, for example based on a type code or type encoding, the secure browser defining a set of functionality restricted with respect to the functionality of the browser alone; invoking the secure browser; receiving the secure content for presentation in the secure browser; and communicating an input from the user, through the secure browser, to a cooperative server. The functionality may be limited navigational functionality (e.g., access of unrestricted documents, documents outside a specified set, or access of other applications or windows), data manipulation functionality, data export functionality (e.g., print, copy, save, cut, paste, etc.), or the like. The server may authenticate the secure browser, and likewise, the secure browser may authenticate the server, before presenting the secure content. The secure browser may restrict termination of its own execution.

The secure browser may be granted principal application level control over graphic user interface inputs from a user, and/or exclusive control over graphic user interface functionality when invoked.

Additional Protection of Graphics

Additionally, the secure browser may protect graphics, multimedia or other resource files referenced from within the HTML, XML or other secure content technology in the pages being accessed by the browsers. The resources, for example, are delivered by a content server, configured to detect the secure browser and only deliver to this, in the same way that the main content itself is protected. This would deal with the issue, common in Internet testing, that even if a test is protected, the graphics within it are not. The secure server, in this case, may be the same or different from the secure server delivering the text. It is further possible to provide direct secure server intercommunication, or to use the secure browser to pass messages between secure servers, which may include, for example, authorization tokens, financial accounting information, indexes or content identification information, or the like.

DETAILED DESCRIPTION OF THE PREFERRED EMBODIMENTS

According to the present invention, the secure browser may still use basic internet technologies (http, html, MIME types, etc) to ease deployment issues; launch a secure browser from a normal browser; be initiated by a triggering link; and employ secure browser calls back to gather actual content.

Example 1

Figure 1:
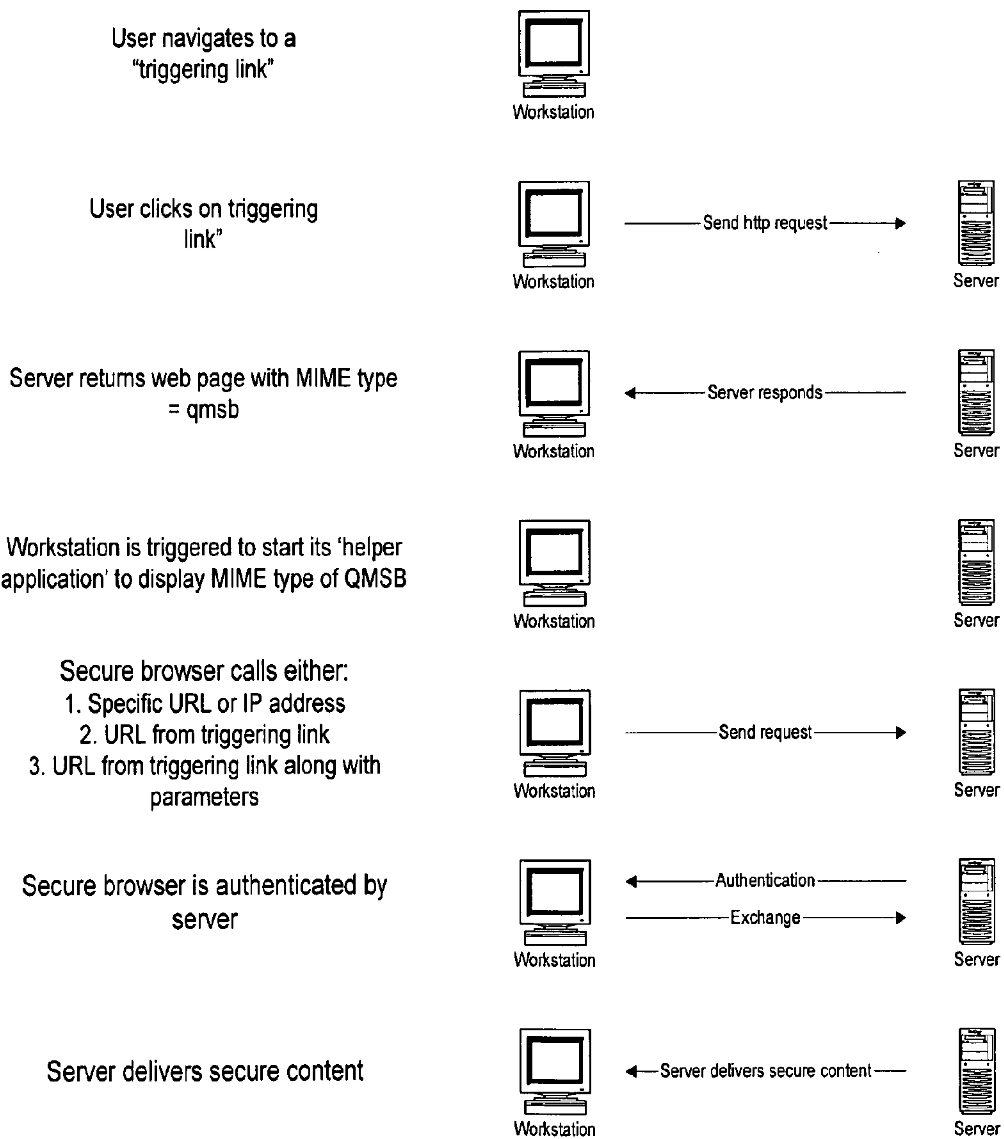
FIG. 1 shows a flow diagram of a method according to the present invention.

According to a first embodiment of the invention, a communication steam is provided between a user's computer and a server, exemplified as follows by sample HTTP headers. This interaction is represented in FIG. 1.

Headers Sent when Browser Calls Web Server

GET /q/open.dll HTTP/1.0
Accept: */*
Accept-Language: en-gb
Pragma: no-cache
User-Agent: Mozilla/4.0 (compatible; MSIE 6.0; Windows NT 5.0; .NET CLR 1.0.3705)
Host: localhost Headers Sent when Web Server Responds to Browser HTTP/1.1 200 OK
Server: Microsoft-IIS/5.0
Date: Wed, 14 May 2003 15:03:58 GMT
Content-Type: text/html Secure Browser Headers Possible example headers sent when web server responds to browser calling the 'trigger'; note MIME type qmsb.

HTTP/1.1 200 OK
Server: Microsoft-IIS/5.0
Date: Wed, 14 May 2003 15:03:58 GMT
Content-Type: application/qmsb Possible example headers sent by secure browser when calling server; note security code which is passed from secure browser to web server:

GET /q/open.dll HTTP/1.0
Accept: */*
Accept-Language: en-gb
Pragma: no-cache
User-Agent: Secure Browser
Security-Code: 47bce5c74f589f4867 dbd57e9ca9f808
Security-Expires: 15:05:2003:03:25
Host: localhost Example 2

Figure 2:
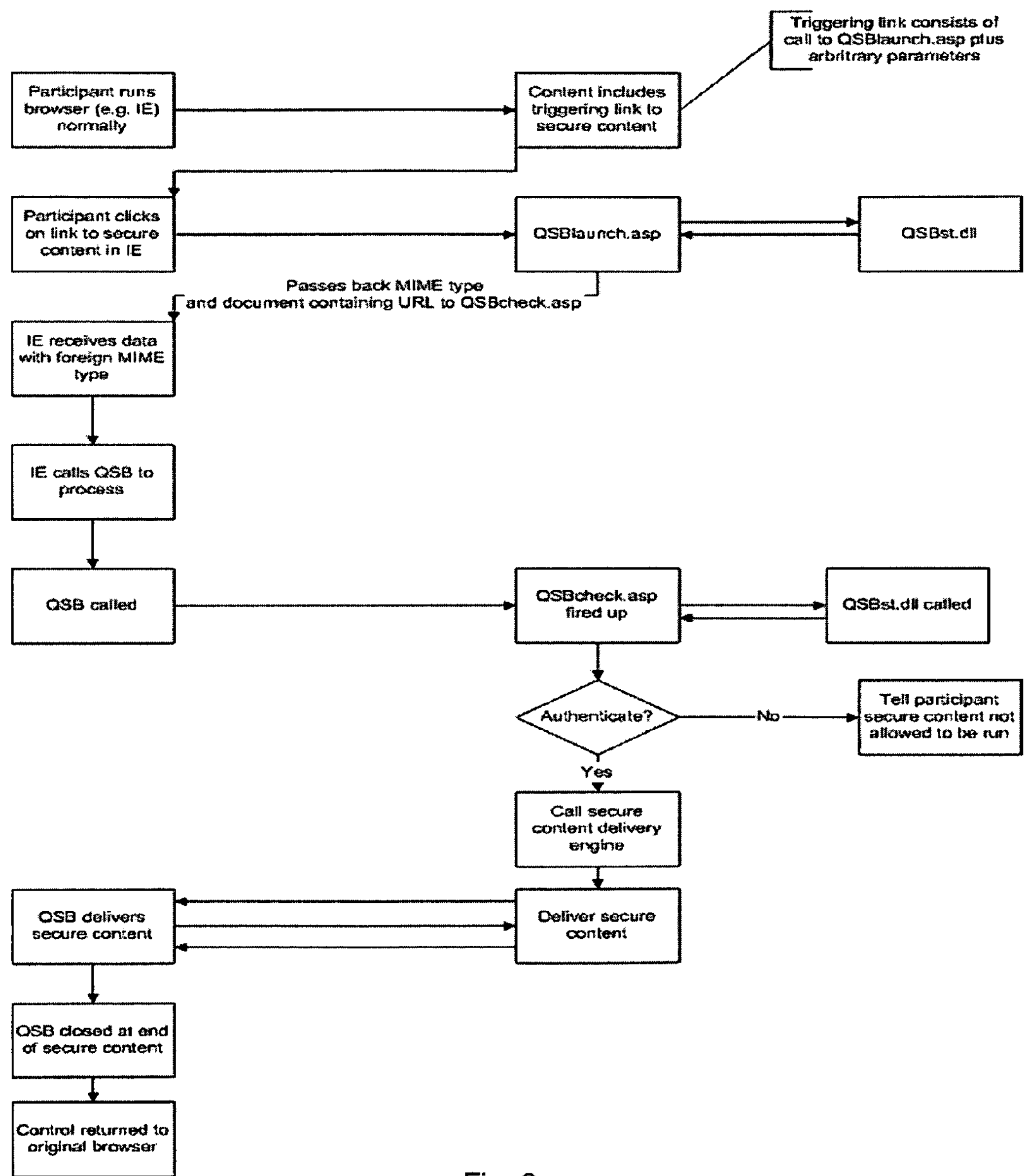
FIG. 2 shows a flowchart of a method according to the present invention.

Questionmark™ Secure (QS) is a secure browser, based on Internet Explorer, which delivers secure content like assessments to participants. When using QS, the user browser navigation controls and keys are, or may be, rendered non-functional, and the participant is forced to view and interact with the secure content, and cannot do other things on their PC. The secure browser also resists attempts to copy, export, or print the secure content. The operation of this embodiment is shown in the flowchart of FIG. 2.

Server Software Structure

There are four server programs:

- QSBlaunch, a program which is used to launch QSB
- QSBcheck, a program which is used to authenticate QSB
- The actual secure content delivery program which is called by QSBcheck
- A Component Object Model (COM) object (QSBst.dll) which provides services to QSBlaunch and QSBcheck The COM object is the formal Server Technologies used by QSB. The other programs are written by the assessment author, for example based on example code.

QSBlaunch and QSBcheck are, for example, ASP programs, but they could easily be written in any server side language. The programs may reside on the same server, though since they call each other by HTTP, this is not strictly necessary. The COM object must be registered and present on the same server as QSBlaunch and QSBcheck. It would also be possible for the separate functions of QSBlaunch, QSBcheck and secure content delivery to be combined into a single program.

The URL to QSBlaunch is, for example, www.xyz.com/qsblaunch.asp and the URL to QSBcheck is www.xyz.com/qsbcheck.asp.

Triggering Link

The triggering link consists of the URL to QSBlaunch, followed by arbitrary parameters. The parameters will typically define the assessment to be run. All parameters must be URL encoded in the usual way.

Example Triggering Links:

www.xyz.com/qsblaunch.asp?Assessment=12345&Group=Potato
www.xyz.com/qsblaunch.asp?Token=12345678901234

What QSBlaunch does

QSBlaunch does the following:

- It receives on the command line the parameters
- It knows the URL of the QSBcheck.asp or similar program.
- It calls QS Server technologies (QSBst.dll) to pass the url and parameters and gets back a checksum.
- It then constructs a dynamic .qmsb document containing the URL, parameters, version and checksum.
- This .qmsb document is itself encrypted to ensure that QS only will run from an approved source
- It sends it back to the browser with content type .qmsb. ASP code to do this is as follows: Response.ContentType="application/x-qmsb" Response.AddHeader "Content-Disposition", "filename=qsblaunch.qmsb"

The QMSB file will contain a message at the top in case it is read in error, for example:

"If you are reading this file, then there has been an error in installing the Questionmark Secure. You need to install Questionmark Secure from <url> and you need to set up your browser to call Questionmark Secure on the MIME type of application/x-qmsb."

What Happens at the Client End after QSBlaunch Runs

QSBlaunch sends back a document, which is of MIME type, associated with QSB.

If Questionmark Secure Browser is not installed, there is no way that the participant can proceed. They have to install Questionmark Secure Browser and re-run the triggering link. Or it may be possible to have the server deliver a message to the user telling them where to install it, or helping them automatically do so.

When QS is installed, the install program will configure QS as being associated with the MIME type above. This will automatically ensure that IE 5+ associates the type with QS. The install program may also attempt to configure Netscape to treat QSB as a helper application for this MIME type, or identify and configure other browsers to properly view QSB-documents.

If the user's browser is not configured to run QS, then the user may be asked if they want to save or open the file. Of course, the server will not deliver secure content in such a circumstance, since the secure browser is not operative to generate an anticipated response. Even if the user's computer system is configured to run QS, they may have to confirm that they want to. Provided the user's browser is set correctly, this will call QS to run the document.

QS then:

- Checks the checksum within the QMSB file is valid. If not, it refuses to run, and generates a message
- Checks the version within the QMSB file, and if the version is greater than supported by the QSB, refuses to run, saying that it needs to be upgraded
- Constructs a call to QSBcheck, using the URL in the file
- Includes the parameters
- Includes a checksum in the HTTP header for QSBcheck to check QSBcheck QSBcheck makes a call to QSBst.dll to check the HTTP header to see that it has been called by QS. It also can check the date/time to ensure that the authority is not copied from a previous attempt to try to spoof the system. Providing it has been called correctly, then it passes on the parameters to the secure delivery software, which then delivers the secure content, safe in the knowledge that it is doing so to QSB.

Further security is provided between QSBcheck and the secure delivery software, to ensure that the secure delivery software knows that it has been called by QSBcheck and not another program. Such handshaking and inter-process communication is well known in the art.

It is also possible, for greater security, for the secure content delivery software to perform the same checks as QSBcheck does each time it interacts with QS. It should be safe just to authenticate once, but if HTTP sniffing is a concern, then it is possible to authenticate each time.

Example URLs

An example interactive communication trail is provided below:

Triggering link is:

www.xyz.com/qsblaunch.asp?Assessment=12345&Group=Potato

QSBlaunch sends to QSB:

URL=www.xyz.com/qsbcheck.asp?Assessment=12345&Group=Potato Checksum=1234567890

Call to QSBcheck is:

URL=www.xyz.com/qsbcheck.asp?Assessment=12345&Group=Potato HTTP header contains a checksum QSBcheck then passes to secure delivery software www.xyz.com/runsecurecontent.asp?Assessment=12345&Group=Potato?Token=3456 where Token is used to identify QSBcheck

Note that it would be possible to include a transaction ID within the parameters in the triggering link, which is used by QSBcheck or the secure content delivery program as an additional check. And that the distinction between launch/check/delivery can be instantiated in real separate programs, or can be three functions of the same program.

Example 3

The QSB Server Technologies (QSBst) interface in the form of a Microsoft COM object. It's main purpose will be to assist the server side delivery application with encryption and authentication capabilities.

The algorithm used for encryption is an XOR based encryption technique based on keys internal to QSBst. The algorithm for authentication is an MD5 checksum derived from a mixture of http header information and secret keys internal to both QSB and QSBst.

QSBst supports the IDispatch interface, allowing it to be accessed from scripting technologies such as VBscript and ASP.

QSBst interface consists primarily of four properties and two methods which are detailed in the following section.

Interface Structure

The interface is called IQSBSecurity, with a program ID of QSBst.QSBSecurity.1, this is the ID that is passed to the object creation function on the server side application.

Enums

VersionEnum

Version40

The version enum is used by the EncryptURL method to determine which algorithm to use internally to encrypt the URL.

| Properties | | | |
|---|---|---|---|
| Name | Type | Get/Set | Description |
| FormatHex | BSTR | Get/Set | Determines whether or not the string returned from the encryption routine is encoded with hexadecimal characters. |
| Logging | VARIANT_BOOL | Get/Set | Provides log information. |
| LogFile | BSTR | Get/Set | The path and name of log file. |
| AppendLog | VARIANT_BOOL | Get/Set | Whether logging information is appended to an existing file if it exists or to clear and previous log information. |

| Methods | | |
|---|---|---|
| Name | Parameters | Return Type |
| EncryptURL | [in] BSTR URL<br>[in] BSTR Parameters<br>[in] VersionEnum EncryptionVersion | BSTR |
| This method takes in as arguments the URL that QSB will navigate to, along with any query string parameters, and the version number of the encryption algorithm to be used. If successful the method will then return an encrypted string created from keys internal to QSBst and QSB. | | |
| AuthenticateQSBRequest | [in] BSTR UserAgent<br>[in] BSTR QSBIEVersion<br>[in] BSTR RequestedUrl<br>[in] BSTR TimeRequestMade<br>[in] BSTR QSBChecksum | VARIANT_BOOL |
| The parameters to this method are extracted from the http headers sent in the form of a request by QSB. This method takes in as parameters the version of IE that is used internally by QSB, the URL requested by QSB, the local time on the client machine the request was made and a checksum generated internally by QSB. The method uses the parameter arguments to create an MD5 checksum; the method then compares the checksum created to the checksum passed in from QSB. If the checksums match the method returns VARIANT_TRUE to signal that the navigation request indeed came from QSB and not some other app trying to impersonate QSB. | | |

Example 4

A Learning Management System (LMS) is a web-based software program that manages how learners access electronic and class-based learning. Commonly a participant logs into an LMS in a browser and then is able to take courses, assessments and be directed to appropriate places that allow learning and/or assessment to take place.

LMSs can call assessments using a variety of protocols including a standard promulgated by the AICC called AICC HACP, a specification promulgated by ADL SCORM called the SCORM 1.2 Runtime Environment and proprietary protocols. LMSs can make calls to Questionmark Perception via any of these means using a protocol called Perception Integration Protocol (PIP).

The use of PIP is controlled by an ASCII PIP file on the Perception Server, which defines what sort of interaction from the LMS is permitted. It's possible to define that Questionmark Secure (a secure browser) is popped up from the LMS by making this setting in a PIP file. For example the following PIP file makes all calls from an LMS via this PIP file call Questionmark Secure and it also arranges that the Home button at the end of assessment closes the secure browser.

```
; qsTest.pip
; demonstrates invoking Questionmark Secure
; sets Home button to close QS at end
; call with
  session.dll?call=qsTest&NAME=<your_name>
; September 2003
[Input]
NAME=NAME
GROUP="Testing"
DETAILS="Questionmark Secure"
; amend session to match assessment ID on your system
SESSION="7446569868587320"
[Settings]
UseNotify=no
Require QS=yes
UseHome=yes
Home=javascript:SB_ExitQS( );
```

Using a PIP file like this, it means that users of corporate LMSs from companies like Saba, Plateau, Docent, Thinq, or academic course management systems like Blackboard and WebCT, can invoke a secure browser without making any change to the LMS. Providing they can call Perception via one of the supported protocols via PIP, then a secure browser can come up when the assessment is taken—the participant uses an ordinary browser to run the LMS and then a secure browser to take the assessment.

APPENDIX

All the below code examples are presented for illustrative purposes only. These can be coded in different ways using different technologies.

Sample QSBCheck.asp

```
<%
'Create instance of QSBSecurity object
Dim qs
Set qs = Server.CreateObject("QSBst.QSBSecurity.1")
'Build URL string from header information
Dim sURL
sURL = "http://" & Request.ServerVariables("HTTP_HOST") &
Request.ServerVariables("PATH_INFO") & "?" &
Request.ServerVariables("QUERY_STRING")
Dim sIEVersion, sRequestTime, sSecurityCode, sUserAgent
sIEVersion = Request.ServerVariables("HTTP_MSIE_VERSION")
sRequestTime = Request.ServerVariable("HTTP_REQUEST_TIME")
sSecurityCode =
Request.ServerVariable("HTTP_QSB_SECURITYCODE")
sUserAgent = Request.ServerVariable("HTTP_USER_AGENT")
If qs.AuthenticateQSBRequest( sUserAgent, sIEVersion, sURL,
sRequestTime, sSecurityCode ) == false
    ' Authentication failed therefore redirect to error page
    Response.Redirect("ErrorPage.Asp")
Else
    ' Authentication succeeded, navigate to secure content.
    ' Add parameter information to session object
    as server.transfer method cannot pass on
    ' parameters information.
    Session("AssessmentID") =
    Request.QueryString("AssessmentID")
    Session("Group") = Request.QueryString("Group")
    'Server.Transfer is required because response.redirect causes
    an message box to appear in
    'QSB.
    Server.Transfer("SecureContent.asp")
End If
%>
```

The qsbcheck.asp can be used as a base template for authenication on any asp page that contains secure content.

Sample SecureContent.asp

```
<%
'Create instance of QSBSecurity object
Dim qs
Set qs = Server.CreateObject("QSBst.QSBSecurity.1")
'Build URL string from header information
Dim sURL
sURL = "http://" & Request.ServerVariables("HTTP_HOST") &
Request.ServerVariables("PATH_INFO") & "?" &
Request.ServerVariables("QUERY_STRING")
Dim sIEVersion, sRequestTime, sSecurityCode, sUserAgent
sIEVersion = Request.ServerVariables("HTTP_MSIE_VERSION")
sRequestTime = Request.ServerVariable("HTTP_REQUEST _TIME")
sSecurityCode =
Request.ServerVariable("HTTP_QSB_SECURITYCODE")
sUserAgent = Request.ServerVariable("HTTP_USER_AGENT")
If qs.AuthenticateQSBRequest( sUserAgent, sIEVersion, sURL,
sRequestTime, sSecurityCode ) == false
    ' Authentication failed therefore redirect to error page
    Response.Redirect("ErrorPage.Asp")
End If
%>
<html>
    <head>
    </head>
    <body>
        This is a secure contents page
    </body>
</html>
The server side script in the above sample code is required only for pages
that require authentication that QSB has requested the page. If a page
does not require authentication then the above server side script may be
omitted. (Note that if authentication is omitted from the asp page then
there needs to be a check put in place to ensure that the page has been
called from qsbcheck.asp and not another url.)
```

Sample QSBLaunch.asp

```
<%
'Return asp page back to client as a .qmsb file
Response.ContentType = "application/x-qmsb"
Response.AddHeader "Content-Disposition", "filename=test.qmsb"
'Create instance of QSBSecurity object
Dim qs
Set qs = Server.CreateObject("QSBst.QSBSecurity.1")
' We wish the encrypted url to be returned as an hex encoded string
qs.FormatHex = true
' Set the url that QSB will navigate to upon launch along with any
query string parameters.
Dim sUrl
sUrl = "http://www.company.com/qsb/qsbcheck.asp?AssessmentID=" &
Request.QueryString("AssessmentID") & "&Group=" &
Request.QueryString("Group")
```

-continued

```
'Encrypt Url
Dim sEncryptedUrl
sEncryptedUrl = qs.EncryptURL( sURL, " ",1 )
%>
URL=<%=sEncryptedURL%>
<% Set qs = nothing %>
If you are reading this file, then you are in error. You need to install
Questionmark Secure Browser from <url> and you need to
set up your browser to call Questionmark Secure Browser
on the MIME type of application/x-qmsb.
The above message is sample message that is sent in the qmsb file that
can be read by the end user if they have advertently saved and opened
the file.
```

Sample QSBLink.htm

```
<html>
    <head>
    </head>
    <body>
        <a href="http:// www.company.com/qsb
        /qsblaunch.asp?AssessmentID=1234567890123456&Group=
        Test">Launch
        QSB</a>
    </body>
</html>
```

GLOSSARY

Content Type Header

The Content-Type header field is used to specify the nature of the data in the body of an entity, by giving type and subtype identifiers, and by providing auxiliary information that may be required for certain types.

HTML—(HyperText Markup Language)

Hypertext Markup Language. A standardized language of computer code, imbedded in "source" documents behind all Web documents, containing the textual content, images, links to other documents (and possibly other applications such as sound or motion), and formatting instructions for display on the screen. When you view a Web page, you are looking at the product of this code working behind the scenes in conjunction with your browser. Browsers are programmed to interpret HTML for display.

HTTP—(HyperText Transfer Protocol)

HTTP has been in use by the World-Wide Web global information initiative since 1990. The Hypertext Transfer Protocol (HTTP) is an application-level protocol for distributed, collaborative, hypermedia information systems. It is a generic, stateless, protocol which can be used for many tasks beyond its use for hypertext, such as name servers and distributed object management systems, through extension of its request methods, error codes and headers. A feature of HTTP is the typing and negotiation of data representation, allowing systems to be built independently of the data being transferred. The protocol for moving hypertext files over the Internet. HTTP requires an HTTP client program on one end, and an HTTP server at the other. HTTP is the most important protocol used in the World Wide Web (WWW) for browsing the web.

HTTP Header

The information put at the top of HTTP messages to aid communication by HTTP

Hypertext

On the World Wide Web, the hypertext feature, built into HTML, that allows a text area, image, or other object to become a "link" (as if in a chain) that retrieves another computer file (another Web page, image, sound file, or other document) on the Internet. The range of possibilities is limited by the ability of the computer retrieving the outside file to view, play, or otherwise open the incoming file. It needs to have software that can interact with the imported file. Many software capabilities of this type are built into browsers or can be added as "plug-ins."

MIME—(Multipurpose Internet Mail Extensions)

Originally a standard for defining the types of files attached to standard Internet mail messages. The MIME standard has come to be used in many situations where one computer programs needs to communicate with another program about what kind of file is being sent. For example, HTML files have a MIME-type of text/html, JPEG files are image/jpeg, etc. If an operating system has registered a MIME type, the browser decodes the file and launches a helper application.

MIME Type

The MIME-Version header field is required at the top level of a message. It is required for the embedded headers of a body of type "message" if and only if the embedded message is itself claimed to be MIME-compliant. It is by using MIME types that an operating system knows which helper application to use. For example use Microsoft Word to display files ending in .DOC and Adobe Acrobat to display files ending in PDF.

What is claimed is:

1. A method for interacting with a user, comprising:

communicating with a client and at least one cooperative server through a normal web browser, wherein the communication with the client and the at least one cooperative server through the normal web browser includes sending, from the normal browser at the client to the at least one cooperative server, a normal IP command when selecting a normal URL through the normal web browser;

in response to the at least one cooperative server receiving the normal IP command from the normal URL selected through the normal browser at the client, receiving, at the client, an associated type code indicative of a requirement for a secure web browser having restricted functionality with respect to a functionality of the normal web browser;

launching the secure web browser at the client for handling secure content, wherein the secure web browser is automatically launched at the client based at least in part on the type code received at the client in response to the at least one cooperative server receiving the normal IP command from the normal URL selected through the normal browser at the client;

requesting, by the secure web browser from the at least one cooperative server, the secure content associated with the type code, wherein the secure content is requested by the secure web browser in response to the at least one cooperative server receiving the normal IP command from the normal URL selected through the normal browser at the client;

receiving the secure content with the launched secure web browser for handling the secure content, wherein the secure content is not available for use by the user in the normal web browser and the launched secure web browser imposes restrictions on availability outside of the secure web browser of data derived from the secure content; and communicating an input from the user, through the secure web browser, to the at least one cooperative server.

2. The method according to claim 1, further comprising limiting access of the user, with the secure web browser, to documents outside of a specified set.

3. The method according to claim 1, further comprising authenticating the secure web browser, to assure that the secure web browser having the restricted functionality is authentic and available for handling of the secure content.

4. The method according to claim 1, wherein the secure web browser lacks one or more of the following functions: print, save, cache, cut and copy, wherein the restrictions prevent one or more other applications from implementing the one or more lacking functions.

5. The method according to claim 1, further comprising transforming, by the secure web browser, text information into graphic objects for handling by the client.

6. The method according to claim 1, further comprising restricting termination of the secure web browser by the secure web browser.

7. The method according to claim 1, wherein the secure web browser comprises an applet executing within an environment of the normal web browser.

8. The method according to claim 1, wherein the normal web browser provides data export support functionality and the secure web browser has restricted data export functionality with respect to the data export functionality of the normal web browser, and wherein the secure content is encrypted according to a public key-private key protocol.

9. A computer program product residing on a non-transitory computer readable medium having a plurality of instructions stored thereon which, when executed by a processor, cause the processor to perform operations comprising:

communicating with a client and at least one cooperative server through a normal web browser, wherein the communication with the client and the at least one cooperative server through the normal web browser includes sending, from the normal browser at the client to the at least one cooperative server, a normal IP command when selecting a normal URL through the normal web browser;

in response to the at least one cooperative server receiving the normal IP command from the normal URL selected through the normal browser at the client, receiving, at the client, secure content having an associated type code indicative of a requirement for a secure web browser having restricted functionality with respect to a functionality of the normal web browser;

launching the secure web browser at the client for handling the received secure content, wherein the secure web browser is automatically launched at the client based at least in part on the type code received at the client in response to the at least one cooperative server receiving the normal IP command from the normal URL selected through the normal browser at the client;

requesting, by the secure web browser from the at least one cooperative server, the secure content associated with the type code, wherein the secure content is requested by the secure web browser in response to the at least one cooperative server receiving the normal IP command from the normal URL selected through the normal browser at the client;

receiving the secure content with the launched secure web browser for handling the secure content, wherein the secure content is not available for use by the user in the normal web browser and the launched secure web browser imposes restrictions on availability outside of the secure web browser of data derived from the secure content; and communicating an input from the user, through the secure web browser, to the at least one cooperative server.

10. A method for interacting with a user, comprising:

communicating with a client and at least one cooperative server through a normal web browser, wherein the communication with the client and the at least one cooperative server through the normal web browser includes sending, from the normal browser at the client to the at least one cooperative server, a normal IP command when selecting a normal URL through the normal web browser;

in response to the at least one cooperative server receiving the normal IP command from the normal URL selected through the normal browser at the client, receiving, at the client, an associated type code indicative of a requirement for a secure web browser having restricted functionality with respect to a functionality of the normal web browser;

launching the secure web browser at the client for handling the received secure content, wherein the secure web browser is automatically launched at the client based at least in part on the type code received at the client in response to the at least one cooperative server receiving the normal IP command from the normal URL selected through the normal browser at the client.

11. The method according to claim 10, wherein the secure web browser provides restricted navigational functionality with respect to navigational functionality of the normal web browser.

12. The method according to claim 10, further comprising, when the secure web browser is launched, limiting access of the user to a set of documents within a predetermined set.

13. The method according to claim 10, further comprising authenticating the secure web browser with a remote server prior to presenting decrypted content of the secure content to a user at the client.

14. The method according to claim 10, wherein the secure web browser prevents use of one or more of the following functions: save, copy, and navigate to unrestricted documents.

15. The method according to claim 10, further comprising restricting, by the secure web browser, termination of the secure web browser.

16. The method according to claim 10, wherein encrypted information to encrypt the secure content is encrypted using a public key-private key protocol.

17. The method according to claim 10, wherein encrypted information to encrypt the secure content is encrypted using a shared secret protocol.

18. The method according to claim 10, wherein the secure web browser is granted exclusive control over graphic user interface functionality of the client when launched.

19. The method according to claim 10, further comprising authenticating the at least one cooperative server by the secure web browser prior to presenting decrypted information to decrypt the secure content to the client.

20. A computer program product residing on a non-transitory computer readable medium having a plurality of instructions stored thereon which, when executed by a processor, cause the processor to perform operations comprising:

communicating with a client and at least one cooperative server through a normal web browser, wherein the communication with the client and the at least one cooperative server through the normal web browser includes sending, from the normal browser at the client to the at least one cooperative server, a normal IP command when selecting a normal URL through the normal web browser;

in response to the at least one cooperative server receiving the normal IP command from the normal URL selected through the normal browser at the client, receiving, at the client, an associated type code indicative of a requirement for a secure web browser having restricted functionality with respect to a functionality of the normal web browser;

launching the secure web browser at the client for handling the received secure content, wherein the secure web browser is automatically launched at the client based at least in part on the type code received at the client in response to the at least one cooperative server receiving the normal IP command from the normal URL selected through the normal browser at the client.

21. An automated computer system for interacting with a user, comprising:

a processor of a client computer configured to execute a normal web browser configured to communicate with at least one cooperative server, wherein the communication with the client and the at least one cooperative server through the normal web browser includes sending, from the normal browser at the client to the at least one cooperative server, a normal IP command when selecting a normal URL through the normal web browser;

in response to the at least one cooperative server receiving the normal IP command from the normal URL selected through the normal browser at the client, a communications interface of the client computer configured to receive, at the client, an associated type code indicative of a requirement for a secure web browser having restricted functionality with respect to a functionality of the normal web browser;

and wherein the processor is further configured to launch the secure web browser at the client computer for handling secure content, wherein the secure web browser is automatically launched at the client based at least in part on the type code received at the client in response to the at least one cooperative server receiving the normal IP command from the normal URL selected through the normal browser at the client.

22. The automated computer system of claim 21 wherein the normal URL includes at least one parameter indicating a particular assessment to be run as the secure content.

* * * * *